(12) United States Patent
Robinson

(10) Patent No.: US 8,400,708 B2
(45) Date of Patent: Mar. 19, 2013

(54) INFRARED WINDOW ASSEMBLY WITH INTERNAL AND EXTERNAL COVER

(76) Inventor: Martin Robinson, Chelmsford (GB)

( * ) Notice: Subject to any disclaimer, the term of this patent is extended or adjusted under 35 U.S.C. 154(b) by 115 days.

(21) Appl. No.: 12/531,942

(22) PCT Filed: Mar. 19, 2008

(86) PCT No.: PCT/GB2008/050198
§ 371 (c)(1),
(2), (4) Date: Sep. 18, 2009

(87) PCT Pub. No.: WO2008/114056
PCT Pub. Date: Sep. 25, 2008

(65) Prior Publication Data
US 2010/0014152 A1    Jan. 21, 2010

(30) Foreign Application Priority Data

Mar. 20, 2007   (GB) .................... 0705298.8

(51) Int. Cl.
*G06K 7/10*   (2006.01)
*B60R 1/06*   (2006.01)
(52) U.S. Cl. ........................ 359/350; 359/508
(58) Field of Classification Search .................. 359/356, 359/508
See application file for complete search history.

(56) References Cited

U.S. PATENT DOCUMENTS

| | | | |
|---|---|---|---|
| 1,547,142 A * | 7/1925 | Bausch | ...................... 206/316.1 |
| 3,336,872 A | 8/1967 | Langen et al. | |
| 5,793,522 A | 8/1998 | Brun | |
| 6,761,467 B2 * | 7/2004 | Matthews et al. | ............. 362/202 |
| 2004/0227987 A1 | 11/2004 | Holliday et al. | |

FOREIGN PATENT DOCUMENTS

| | | |
|---|---|---|
| DE | 29720335 | 11/1997 |
| JP | 11153488 | 6/1999 |

OTHER PUBLICATIONS

XP-022490510 http://web.archive.org/web/20060712203858/http://optik-ripkin.de/katalog/vergroessernde_Sehilfen/katalog Ripken Augenoptik, Jul. 31, 2008.
XP-002490511 http://web.archive.org/web/20060712203858/http://optik-ripkin.de/katalog/vergroessernde_Sehilfen/katalog, Jul. 31, 2008.
International Search Report for PCT Application No. PCT/GB2008/050198.
U.K. Search Report for U.K. Application No. GB 0705298.8.

* cited by examiner

*Primary Examiner* — Jade R Chwasz
(74) *Attorney, Agent, or Firm* — Renner Kenner Greive Bobak Taylor & Weber

(57) ABSTRACT

An infrared window assembly, comprising: a lens through which thermal imagery of apparatus within a housing is performed; a frame adapted to be mounted in the housing and arranged to support the lens; and external and internal covers lying when closed in planes generally parallel to the plane of the frame, the external cover being located on the exterior of the housing, wherein the covers are coupled to one another and mounted on or adjacent the frame and arranged to move in unison between a closed position whereat the lens is substantially concealed and an open position whereat the lens is substantially visible.

11 Claims, 5 Drawing Sheets

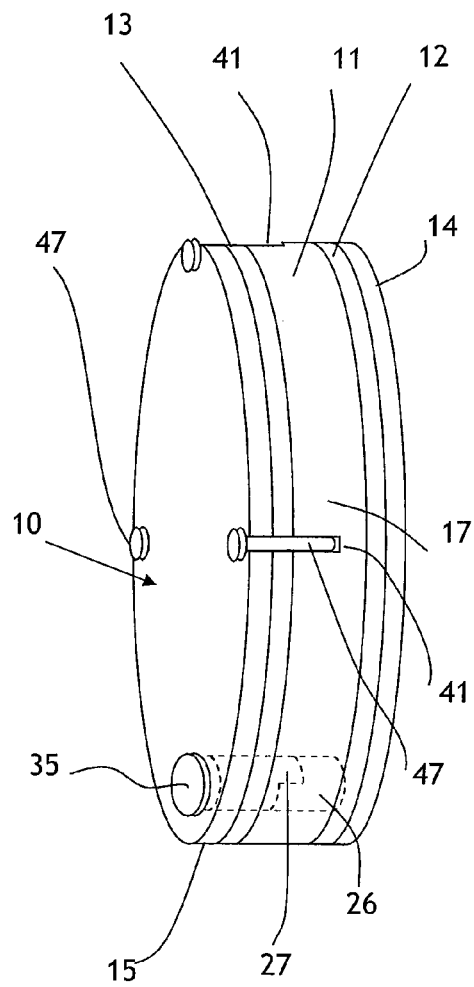
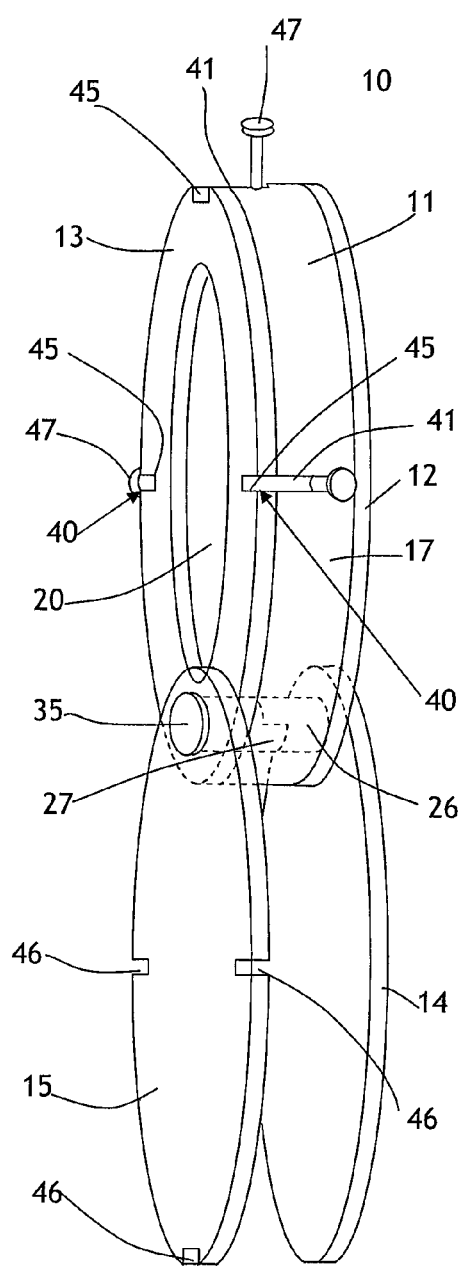
FIG. 1A
FIG. 1B

INFRARED WINDOW ASSEMBLY WITH INTERNAL AND EXTERNAL COVER

The present invention relates to an infrared inspection window assembly and more particularly to an infrared window assembly having covers movable between open and closed positions.

It is known to use infrared cameras to monitor electrical or other suitable installations. Such installations are usually located within a housing or housings so as to isolate the components from the ambient environment—both for their protection and for general safety considerations. Therefore to gain access to the equipment for the purpose of infrared inspections or temperature measurement the housing must be removable or ports, through which the components may be viewed, must be provided. These infrared windows or ports must be provided with panes manufactured from material which permits the transmission of electromagnetic radiation in the infrared wavelength range. Such infrared windows or ports allow viewing of the contents and prevent the ingress of contaminants.

Unfortunately, the cost of the materials from which these panes (or crystals) are made is high, and if high standards are required the cost increases yet further. The high cost of the materials is largely attributed to their ability to allow infrared electromagnetic radiation to pass therethrough, since such materials often provide limited resistance to the adverse ambient conditions to which they are subjected. Such adverse conditions lead to the ingress of dirt on the surface of the lens which is difficult to clean, especially in situ since access to the interior of the housing on which they are located is often very limited. Furthermore, the lens may become scratched by equipment on the exterior and also the interior of the housing.

Generally monitoring is carried out periodically, rather than constantly, and for the majority of the time the thermal panes are acting as expensive contaminant excluders. Thus, it would be ideal to cover the lens of the thermal assembly when not being used for thermal imagery, but this is particularly difficult to achieve for the inside of the housing since access into the interior of the housing is often very limited due to safety considerations. Despite this the inside of the lens is as liable to become damaged or dirty, and cleaning of the inner face prior to imaging cannot be performed without access to the housing.

The object of the present invention is to provide an infrared window assembly which includes covers arranged selectively to overlie and protect the internal and external surfaces of the pane. A further object of the invention is to provide an infrared window assembly having protective covers which are easily and conveniently moved between open and closed positions. Yet a further object of the invention is to provide an infrared window assembly having covers which may be secured in a closed position and moved only by authorised personnel.

According to the invention there is provided an infrared window assembly comprising:
- a lens through which thermal imagery of apparatus within a housing is performed;
- a frame adapted to be mounted in the housing and arranged to support the lens;
- external and internal covers lying when closed in planes generally parallel to the plane of the frame, the external cover being located on the exterior of the housing and the internal cover being located on the interior of the housing; and
- where the covers are coupled to one another and mounted on or adjacent the frame and arranged to move in unison between a closed position whereat the lens is substantially concealed and an open position whereat the lens is substantially visible.

The covers may remain in the plane of the frame when in both the open and closed positions, but they may also simultaneously move out of the plane in opposite directions as they open. Preferably, the covers are pivotally mounted on the frame and rotate in unison between the open and closed positions. The covers may be rotatably mounted to the frame by an axially extending pin which locates in an opening formed coaxially through the frame. The pin may be attached between the inner and outer covers or may be integrally formed with one or formed from portions on each. This will allow the covers to simultaneously rotate about the pin to open. A bolt or similar fastener may extend through one cover and screw into a threaded bore formed in the other cover. Most preferably, a tubular spigot having a generally circular cross-section is provided on each cover and which locate in the opening from opposite ends thereof. The spigots may engage one another in the opening and have co-operating end formations such that as one cover is rotated about the axis of its spigot, so too does the other cover.

In an alternative arrangement a spigot is provided on one of the external and internal covers and a hole is provided on the other of said external and internal covers. The spigot extends through the opening in the frame and has an end portion adapted to co-operate with the hole. A bolt may be adapted to extend through the hole and engage a threaded bore provided in the end of the spigot so as to secure the two covers relative to each other.

The covers could be adapted to slide laterally together to cover or uncover the lens. For this the covers could be linked by one or more member that slides along one or more channel in the frame.

Preferably, locking means are provided on the window assembly which are operable to secure the covers in their closed configuration. Such locking means could take many forms including simple fasteners such as bolts that may be arranged to screw the covers to the frame. The internal and external covers are coupled to one another and move in unison so that if one cover is prevented from moving so too is the other. This means that only the external cover needs to be provided with locking means. The internal cover will in any event usually be inaccessible. Most preferably, a key or special tool is required successfully to disengage the locking means, thereby preventing unauthorised removal of the covers.

In a preferred embodiment the internal cover is made from a rigid, heat resistant material that can withstand the high temperatures to which it may be subjected.

The lens may be a lens assembly comprising: an infrared transmitting pane having two generally opposed surfaces; and a first protective grille lying against one of said opposed surfaces and having an array of holes formed therethrough that permit thermal imaging of the apparatus through the pane.

The first grille may be provided on either inner face or the outer faces depending on the conditions inside and outside the housing, but usually will locate on the exterior side as this is often the most liable to damage. Preferably, a second grille similar to the first is provided on the other face. The holes in the grilles are all of an equal size and shape, and more preferably each hole is a regular polygon in shape with sides of equal length. Most preferably, the holes are a shape that tessellate.

In order that it may be better understood, but by way of example only, one embodiment of the present invention will now be described in detail, reference being made to the accompanying figures, in which:

FIG. 1A is a perspective view of an infrared window assembly according to the present invention having internal and external covers located in a closed position;

FIG. 1B shows the assembly of FIG. 1A with the internal and external covers located in their open position;

Figure 2:
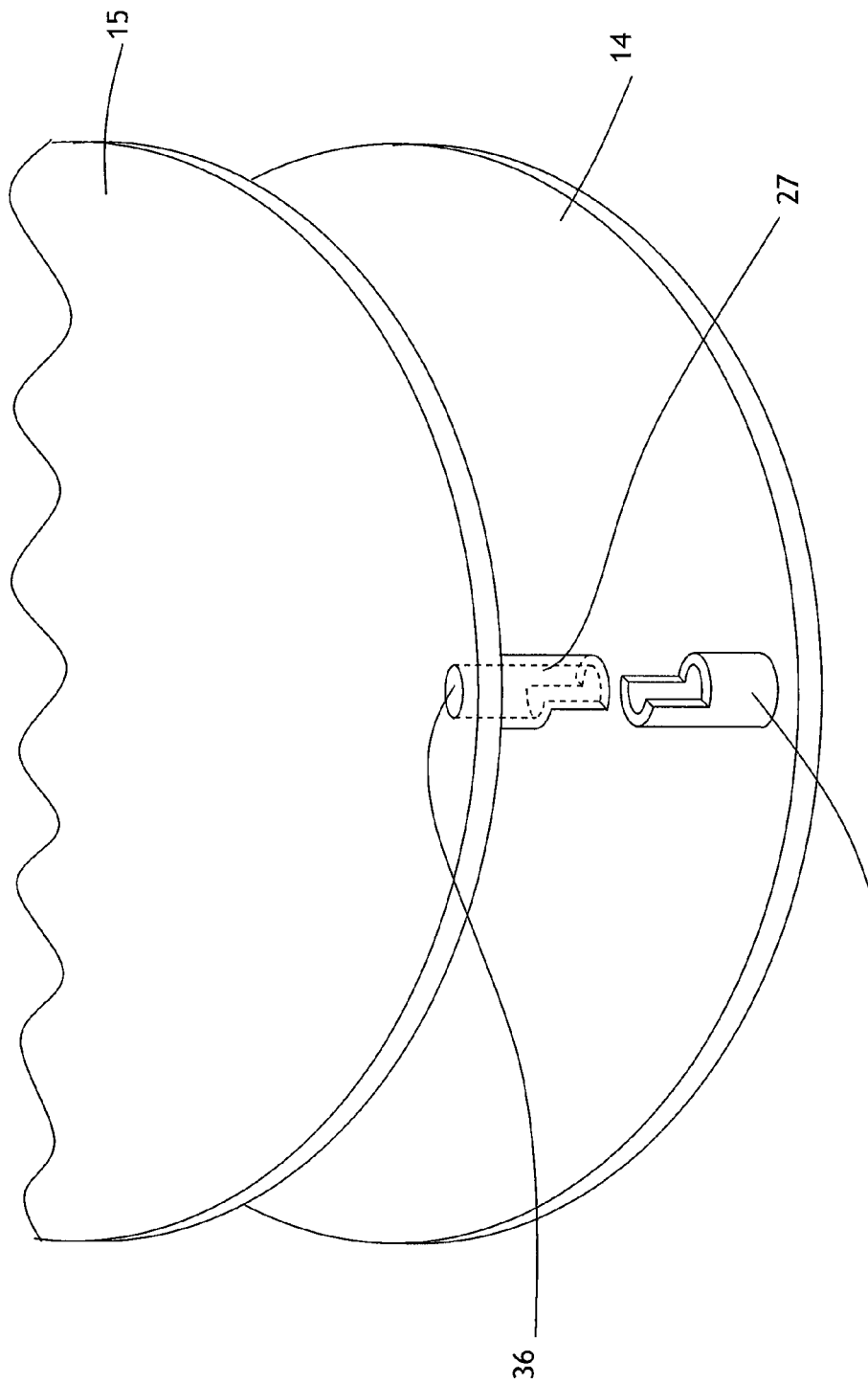
FIG. 2 shows an enlarged perspective view of part of the internal and external covers.
Figure 3:
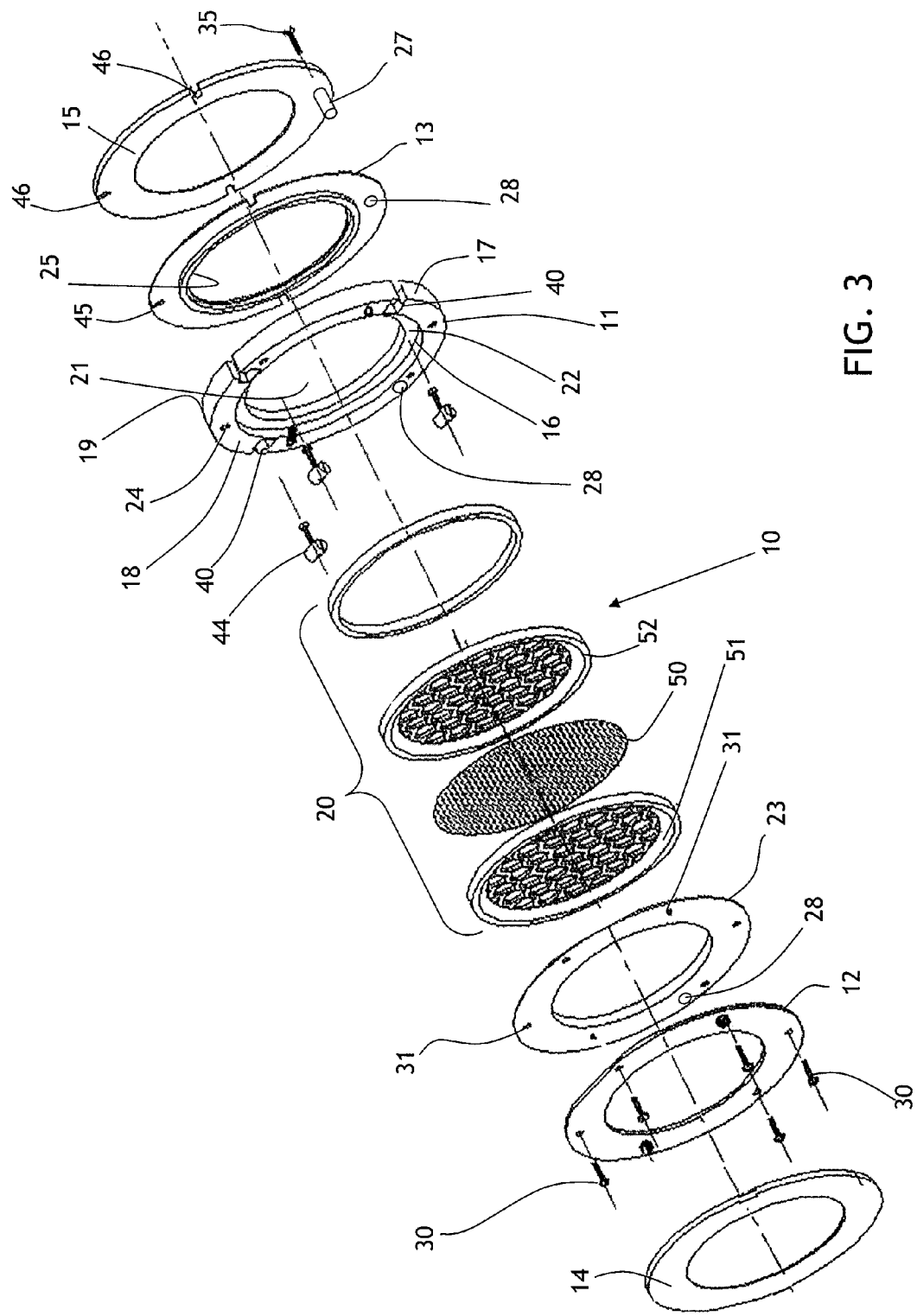
FIG. 3 is a perspective view of the window assembly showing the arrangement of its components.
Figure 4A:
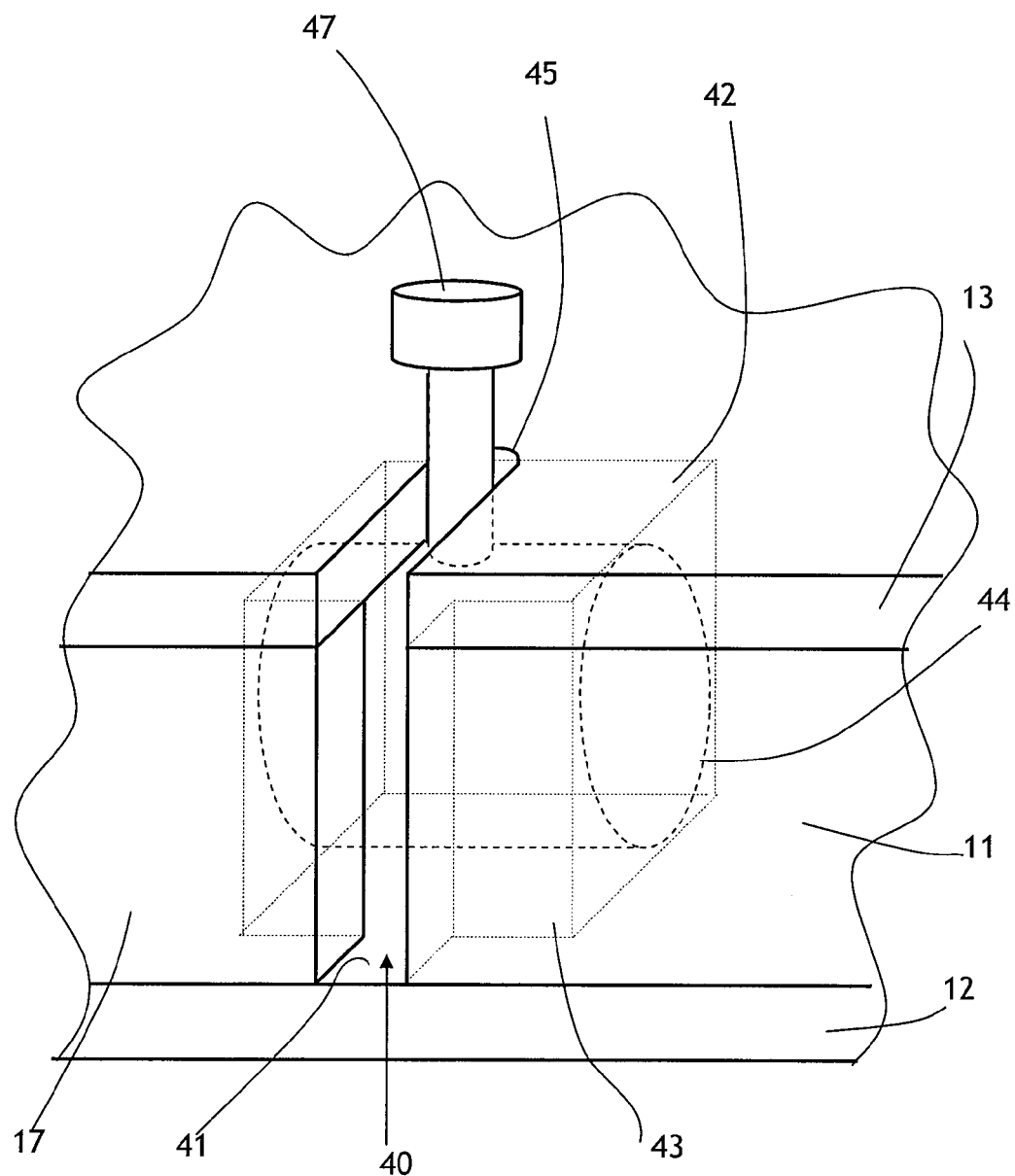
FIG. 4A is an enlarged view illustration of a locking arrangement in its locked configuration.
Figure 4B:
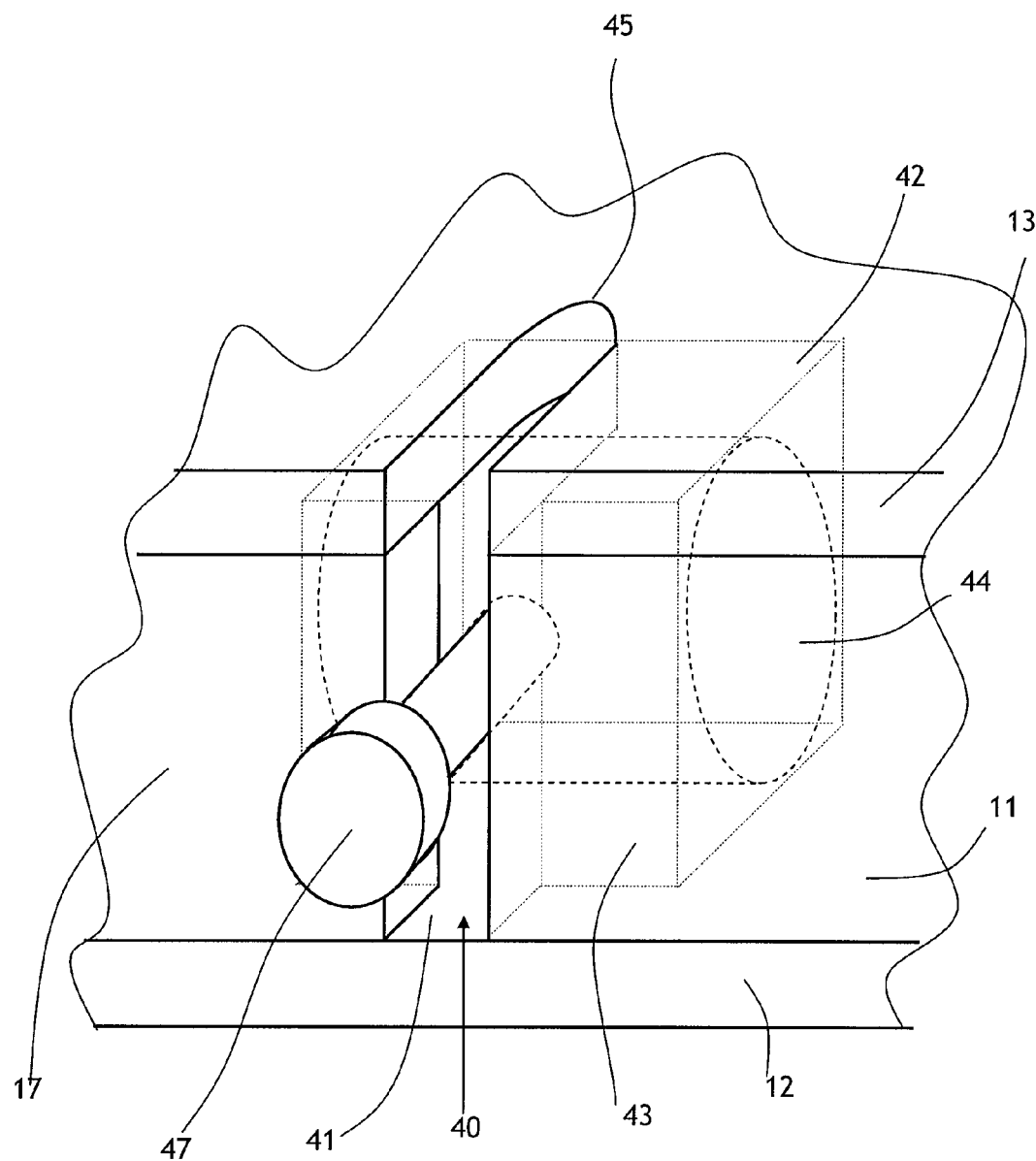
FIG. 4B corresponds to FIG. 3A, but shows the locking arrangement in its unlocked configuration.

Referring to FIGS. 1 to 3, there is shown an infrared window assembly generally indicated 10 and comprising a main frame 11, opposing internal and external side rings 12, 13 and opposing internal and external covers 14,15. The main frame 11 comprises a circular ring having inner and outer circumferential sidewalls 16, 17 and internal and external axial faces 18,19. A circular lens assembly 20 is located in an opening 21 defined by the inner circumferential sidewall 16, which lens assembly bears against an annular flange 22 projecting inwardly from said inner circumferential sidewall 16. A retention ring 23 is located between the internal ring 12 and the main frame 11 and overlies the periphery of the lens assembly 20 to hold it in place. The internal ring 12 is fastened to the main frame 11 by screws 30, or similar fasteners, which extend through holes 31 in the retention ring 23 and engage threaded holes 24 in the main frame 11. The external ring 13 lies against the external face 19 of the main frame 11 and has an axially extending annular flange 25 which locates in the opening 21.

The internal cover 14 and external cover 15 are respectively provided with axially extending tubular spigots 26, 27 that locate in a bore 28 formed through the side rings 12, 13 and the main frame 11, and about which the covers 14,15 are adapted to rotate, see FIG. 2. The spigots 26, 27 have stepped end portions that are arranged to engage each other and couple their rotational movement. A bolt 35 extends through a hole 36 formed axially in the spigot 27 of the external cover 15 and engages a thread (not shown) formed in the interior of the spigot 26 of the internal cover, thereby joining the covers 14, 15. Thus, as the external cover 15 is rotated about the axis of the spigot 27 the torque is transferred to the internal cover 14 by the inter-engagement of the spigots, which causes the internal and external covers 14, 15 to rotate in unison. In FIG. 3, bore 28 on the main frame is not aligned with bore 28 in the external ring and spigot 27 on the external cover, since the external ring and external cover are shown in a different alignment to the rest of the assembly, but these would align when assembled.

Three T-shaped slots 40 are formed in the circumference of the main frame 11 approximately 90 degrees apart. Each T-shaped slot 40 is formed axially through the main frame 11 and has a narrow opening 41 extending radially from the outer circumferential sidewall 17 which widens to define a large opening 42. The internal and external rings 12, 13 bear against the main frame 11 and conceal the slots 40, thereby defining a chamber 43 in which a cylindrical barrel 44 is located. The external ring 13 and the external cover 15 have three matching radial slots 45, 46 formed therethrough, which align with the narrow openings 41 of the slots 40 and are of an equal width thereto. Each barrel 44 is provided with a radial bore (not shown) located midway along its length which is adapted to receive a bolt 47 which may be arranged to extend selectively through its respective narrow opening 41 or radial slots 45, 46. The axis of each barrel 44 lies perpendicular to the axis of the main frame 11 and the radius on which the slot 40 is located, such that the bolts 47 may be pivoted about the axis of the barrel 44 between locked and unlocked configurations. FIGS. 1A and 3A show the bolts 47 in their locked configuration whereat they extend through the radial slots 45, 46 of the external ring 13 and the external cover 15, thereby preventing said external cover 15 from pivoting about the axis of the spigots 26, 27. The bolts 47 may be tightened until their heads 48 bear against the surface of the external cover 15 so that they will not rotate to their unlocked configuration whereat they are free of the narrow slots 45, 46 and extend generally radially from the main frame 11, see FIGS. 1B and 3B. The heads 48 of bolts 47 are secure insofar as they may be rotated only by a special tool, thereby preventing unauthorised opening of the internal and external covers 14, 15.

The thermal window assembly is to be fitted within an aperture provided in a wall of a housing (not shown in the figures), the window assembly being arranged to permit thermal imagery from outside the housing of apparatus located inside the housing. Methods for securing assemblies into apertures are well known in the art, but one of a number of suitable methods would involve locating the main frame on the external face of the housing wall and the internal ring and the internal cover on the internal face of the housing wall. The diameter of the aperture should be slightly smaller than the diameter of the main frame, rings and covers, so that the periphery of the aperture locates between the main frame and the internal cover when the window assembly is secured in place.

As can be seen in FIG. 3, the tens assembly 20, may comprise a pane 50 and first and second grilles 51, 52. The pane 50 is a circular disc having opposed front and rear planar faces and a circumferential edge face. The pane 50 is made of polymeric or crystalline materials that permit the passage of electromagnetic radiation in the infrared range to pass therethrough. The first and second grilles 51, 52 are substantially the same as one another and comprise circular discs having opposed front and rear faces and a circumferential edge. An array of holes is formed through each of the first and second grilles. All the holes are substantially the same size, are spaced a uniform distance apart and arranged in a tessellation, so that they protect the tens but do not interfere with the infrared viewing therethrough.

The invention claimed is:

1. An infrared window assembly mounted within an aperture provided in a wall of a housing, the assembly comprising:
    an infrared transmitting pane through which thermal imagery of apparatus located within the housing is performed;
    a frame mounted within the aperture and arranged to support the pane;
    an external cover and an internal cover, each mounted on or adjacent to the frame and separate from the housing, each cover lying when closed in planes generally parallel to the plane of the frame, the external cover being located on an exterior of the housing and the internal cover being located on an interior of the housing; and
    a coupled arrangement interconnecting each cover such that when the external cover is moved between a closed position, whereat the pane is substantially concealed, and an open position, whereat the pane is substantially visible, the internal cover moves in unison.

2. An infrared window assembly as claimed in claim 1, wherein the covers are pivotally mounted to the frame and are adapted to rotate in unison between the open and closed positions.

3. An infrared window assembly as claimed in claim 1, wherein the covers are mounted for rotation on said frame by a pin located in an opening formed axially through said frame.

4. An infrared window assembly as claimed in claim 3, wherein a tubular spigot having a generally circular cross-section is provided on each cover and which extends through the opening in the frame, each spigot being adapted to co-operate with the other spigot to couple the rotation of one cover to the rotation of the other.

5. An infrared window assembly as claimed in claim 1, wherein a spigot is provided on one of the external and internal covers and an opening is provided on the other of said external and internal covers, the spigot extends through a bore formed in the frame and has an end portion adapted to co-operate with the opening, a bolt may be adapted to extend through the opening and engage a threaded bore provided in the end of the spigot.

6. An infrared window assembly as claimed in claim 1, wherein the frame, infrared transmitting pane and covers are generally circular.

7. An infrared window assembly as claimed in claim 1, wherein locking means are provided to secure the covers in their closed position.

8. An infrared window assembly as claimed in claim 7, wherein the locking means comprises at least one bolt adapted to prevent movement of the covers relative to the frame.

9. An infrared window assembly as claimed in claim 8, wherein the at least one bolt is screwed radially into at least one barrel located in the frame, the bolt being adapted to rotate about a rotational axis of the barrel between an unlocked configuration whereat the bolt extends substantially radially from the frame and a locked configuration whereat the bolt extends substantially axially from the frame, the bolt is adapted to be tightened to prevent rotation between locked and unlocked configurations.

10. An infrared window assembly as claimed in claim 9, wherein only the external cover is provided with locking means.

11. An infrared window assembly as claimed in claim 1, wherein the internal cover is made from heat resistant material that can withstand any high temperatures to which it is subjected.

* * * * *